US007443839B2

(12) United States Patent
Bouthemy et al.

(10) Patent No.: US 7,443,839 B2
(45) Date of Patent: Oct. 28, 2008

(54) USER IDENTIFICATION MODULE FOR ACCESS TO MULTIPLE COMMUNICATION NETWORKS

(75) Inventors: Jean-Luc Bouthemy, Sammamish, WA (US); Tuomo Sipila, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 724 days.

(21) Appl. No.: 10/821,180

(22) Filed: Apr. 9, 2004

(65) Prior Publication Data
US 2005/0021875 A1  Jan. 27, 2005

(51) Int. Cl.
*H04Q 7/20* (2006.01)
(52) U.S. Cl. ............... 370/352; 455/435.1; 455/411
(58) Field of Classification Search .............. 455/434, 455/435.1, 435.2, 435.3, 436, 439, 411; 370/342, 370/343, 352, 353, 354, 395.5
See application file for complete search history.

(56) References Cited

U.S. PATENT DOCUMENTS

H1641 H * 4/1997 Sharman ............... 370/338

| 6,567,667 | B1 * | 5/2003 | Gupta et al. | 455/445 |
| 6,631,259 | B2 * | 10/2003 | Pecen et al. | 455/426.1 |
| 6,714,781 | B2 * | 3/2004 | Pecen et al. | 455/426.1 |
| 6,871,070 | B2 * | 3/2005 | Ejzak | 455/435.1 |
| 2004/0203775 | A1 * | 10/2004 | Bourdeaut et al. | 455/435.1 |
| 2006/0050680 | A1 * | 3/2006 | Naim et al. | 370/352 |

FOREIGN PATENT DOCUMENTS

WO  WO 02/11357 A2  2/2002

OTHER PUBLICATIONS

Verschuren, T., "*Smart access: strong authentication on the Web*", Computer Networks and ISDN Systems 30, vol. 30, No. 16-18, Sep. 1998, pp. 1511-1519, XP004138682.

* cited by examiner

*Primary Examiner*—Blane J Jackson
(74) *Attorney, Agent, or Firm*—Squire, Sanders & Dempsey, LLP (57) ABSTRACT

A communications system is disclosed. The communications system includes a plurality of access networks, at least one user equipment arranged for use in at least one of the access networks, and a user identification module for use in the user equipment. The module is arranged to enable a plurality of access network applications to run.

16 Claims, 7 Drawing Sheets

FIG. 3: 3GPP Release 5 Logical UICC

FIG. 4: Current tree structure of the R-UIM

FIG. 5: Proposed Logical 3G UICC

FIG. 6: Proposed tree structure

FIG. 7
Primitives on the UICC

USER IDENTIFICATION MODULE FOR ACCESS TO MULTIPLE COMMUNICATION NETWORKS

FIELD OF THE INVENTION

The present invention relates to a user identification module for access to multiple communication networks and in particular but not exclusively to a user identification module for third generation telecommunication systems.

BACKGROUND OF THE INVENTION

A communication system is a facility that enables communication between two or more entities such as user terminal equipment and/or network entities and other nodes associated with a communication system. The communication may comprise, for example, communication of voice, electronic mail (email), text messages, data, multimedia and so on.

The communication may be provided by a fixed line and/or wireless communication interfaces. A feature of wireless communication systems is that they provide mobility for the users thereof. An example of a communication system providing wireless communication is a public land mobile network (PLMN) and another example is a wireless local area network (WLAN). An example of the fixed line system is a public switched telephone network (PSTN).

A cellular telecommunications system is a communication system that is based on use of radio access entities and/or wireless service areas. The access entities are typically referred to as cells. Examples of cellular telecommunications systems include standards such as the GSM (Global System for Mobile Communications), GPRS: (General Packet Radio Service), AMPS (American Mobile Phone System), DAMPS (Digital AMPS), WCDMA (Wideband Code Division Multiple Access), UMTS (Universal Mobile Telecommunications System), and CDMA 2000 (Code Division Multiple Access 2000)

A communication system typically operates in accordance with a given standard or specification which sets out what the various elements of a system are permitted to do and how that should be achieved. For example, the standard or specification may define if the user, or more precisely user equipment, is provided with a circuit switched service or a packet switched service or both. Communication protocols and/or parameters which should be used for the connection are also typically defined. For example, the manner in which communication shall be implemented between the user equipment and the elements of the communication networks is typically based on a predefined communication protocol. In other words, a specific set of "rules" on which the communication can be based needs to be defined to enable the user equipment to communicate via the communication system.

The term "service" used above and hereinafter will be understood to broadly cover any service which a user may desire, require or be provided with. The term also will be understood to cover the provision of complimentary services. In particular, but not exclusively, the term "service" will be understood to include Internet protocol multimedia IM services, conferencing, telephony, gaming, rich call, presence, e-commerce and messaging e.g. instant messaging.

The introduction of Third Generation (3G) communication systems has significantly increased the possibilities for accessing services on the Internet via mobile user equipment (UE) as well as other types of UE.

Various user equipment (UE) such as computers (fixed or portable), mobile telephones, personal data assistants or organisers and so on are known to the skilled person and can be used to access the Internet to obtain services. Mobile user equipment is often referred to as a mobile station (MS) and can be defined as a means that is capable of communication via a wireless interface with another device such as a base station of a mobile telecommunication network or any other station. In order to allow a user to operate a range of user equipment terminals, yet retain the same identity user equipment typically can be considered to comprise two elements; the Mobile Equipment terminal (ME) and the Subscriber Identity Module (SIM). An example of the SIM is the UTMS Subscriber Identity Module (USIM). The identity module is a smartcard that holds the subscriber identity and performs authentication steps needed by the ME. The physical separation of the smartcard functionality and the mobile equipment terminal not only allows the user to transfer their identity from terminal to terminal but also improves security. As the security algorithms and encryption keys associated for that user can also be stored on the smart card and isolated from the terminal the terminal carries no data related to the user.

The 3G Partnership Project (3GPP) defines a reference architecture for a core network which provides the users of user equipment UE with access to the services provided via the communication system. This 3G core network is divided into three principal domains. These are the Circuit Switched (CS) domain, the Packet Switched (PS) domain and the Internet Protocol Multimedia (IM) domain.

The latter of these, the IM domain, makes sure that multimedia services are adequately managed. The IM domain supports the Session Initiation Protocol (SIP) as developed by the Internet Engineering Task Force (IETF).

SIP is an application layer signalling protocol for starting, changing and ending user sessions as well as for sending and receiving transactions. A session may, for example, be a two-way telephone call or multi-way conference session or connection between a user and an application server (AS). The establishment of these sessions enables a user to be provided with the above-mentioned services. One of the basic features of SIP is that the protocol enables personal mobility of a user using mobile UE by providing the capability to reach a called party (which can be an application server AS) or another user equipment via a single location independent address.

A user connected to a SIP based communication system may communicate with various entities of the communication system based on standardised SIP messages. SIP is defined in an Internet Engineering Task Force (IETF) protocol specification by G Rosenberg et al titled. "SIP: session initiation protocol" RFC 3261, July 2001. This document is incorporated by reference.

One version of the third generation standard is "Release 5" or "rel5". This introduces the IP multimedia core network subsystem (IMS) that has been developed to use SIP technology as a basis for all IP services such as voice over IP, amongst others. The SIP standard is a rendezvous protocol which can be used to establish media sessions between a SIP user agent client (UAC) and a SIP user agent server (UAS). To open a session, SIP uses the SDP (session description protocol) protocol and it is thus possible to establish a variety of sessions depending on the used application both for real time services and non real time services. SIP is a flexible protocol that can be used to establish different types of sessions. For example, some sessions may require a certain precondition to be satisfied. Other sessions may require reliable provisional responses. Other sessions may require confirmation of reserved resources. It is also possible to have a variable number of SDP offer/answer exchanges.

The present invention relates, in particular, to modifications to the Removable User Identification Module (R-UIM) used in some 3G access networks. The R-IUM is similar to the Subscriber Identification Module (SIM) inserted, for example, in a Global System for Mobile telecommunications (GSM) user equipment. At present, mobile devices using CDMA technology can use the R-UIM to enable connectivity and security, for example, within a cdma2000 access network.

Currently, the R-UIM, and the limitations imposed by using R-UIM, is an issue for the IP Multimedia Subsystem (IMS) harmonisation between the Third Generation Project Partnership (3GPP) and the Third Generation Project Partnership 2 (3GPP2). One of the major limitations of using the R-UIM is that it is not capable of enabling several applications. The R-UIM is further incapable of enabling several applications to be run in parallel. Network applications could be for example a CDMA2000 access network application and an IMS core network application. Furthermore, the R-UIM does not provide the means for distinguishing between different access networks for multi-access mobile devices, e.g. cdma2000 and WLAN access networks.

It is further not possible to implement the separation of access level and IMS level authentication and security mechanisms in a R-UIM/SIM structure as multiple applications are needed to handle the separation.

There is provided according to the present invention a user identification module for user equipment for use in an access network said module being arranged to enable a plurality of access network applications to run.

The plurality of access network applications may be run in parallel.

The module may be arranged to enable at least one core network application to run, and wherein said module may be arranged to enable said core network application to run in parallel with at least one of said plurality of access network applications.

The user identification module may be arranged to generate authentication data for said core network and said access network, wherein said authentication data for said core network and for said access network may be further arranged to be dependent on a common data set.

The common data set possibly comprises data for use in encryption.

The common data set may be arranged to comprise at least one shared key between the access network and the access network application or the core network application, said shared key being possibly arranged to generate the required session key or keys.

The access network may comprise at least one of; a CDMA2000 network; a UMTS network; a IEE802.11 network; a GSM network; a DAMPS network; a AMPS network, a WCDMA network.

The core network application may be an IP multimedia service (IMS).

The module may comprise a Universal Integrated Circuit Card.

According to a second aspect of the present invention there is provided a communications system comprising: a plurality of access networks; at least one user equipment arranged for use in at least one of said access networks; and a user identification module for use in said at least one user equipment, said module being arranged to enable a plurality of access network applications to run.

The plurality of access network applications may run in parallel.

The module may be arranged to enable at least one core network application to run, and wherein said module may be arranged to enable said core network application to run in parallel with at least one of said plurality of access network applications.

The user identification module may be arranged to generate authentication data for said core network and said access network, wherein said authentication data for said core network and for said access network is possibly further arranged to be dependent on a common data set.

The common data set may comprise data for use in encryption.

The common data set may be arranged to comprise at least one shared key between the access network and the access network application or the core network application, said shared key preferably being arranged to generate the required session key or keys.

The access network may comprise at least one of; a CDMA2000 network; a UMTS network; a IEE802.11 network; a GSM network; a DAMPS network; a AMPS network, a WCDMA network.

The core network application may be an IP multimedia service (IMS).

The module may comprise a Universal Integrated Circuit Card.

According to a third aspect of the present invention there is provided a method for operating a user identification module for user equipment for use in an access network, comprising the step of: enabling a plurality of access network applications to run.

The step of enabling a plurality of access network applications to run may comprise; enabling a first access network application to run, enabling a second access network application to run, wherein said first and second access network applications are enabled to run in parallel.

The method may further comprise the step of enabling at least one core network application to run, wherein said step of enabling a plurality of access network applications and said step of enabling at least one core network to run are arranged to enable said at least one core network application to run in parallel with at least one of said plurality of access network applications.

BRIEF DESCRIPTION OF THE DRAWINGS

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention, for which reference should be made to the appended claims.

DETAILED DESCRIPTION

Figure 1:
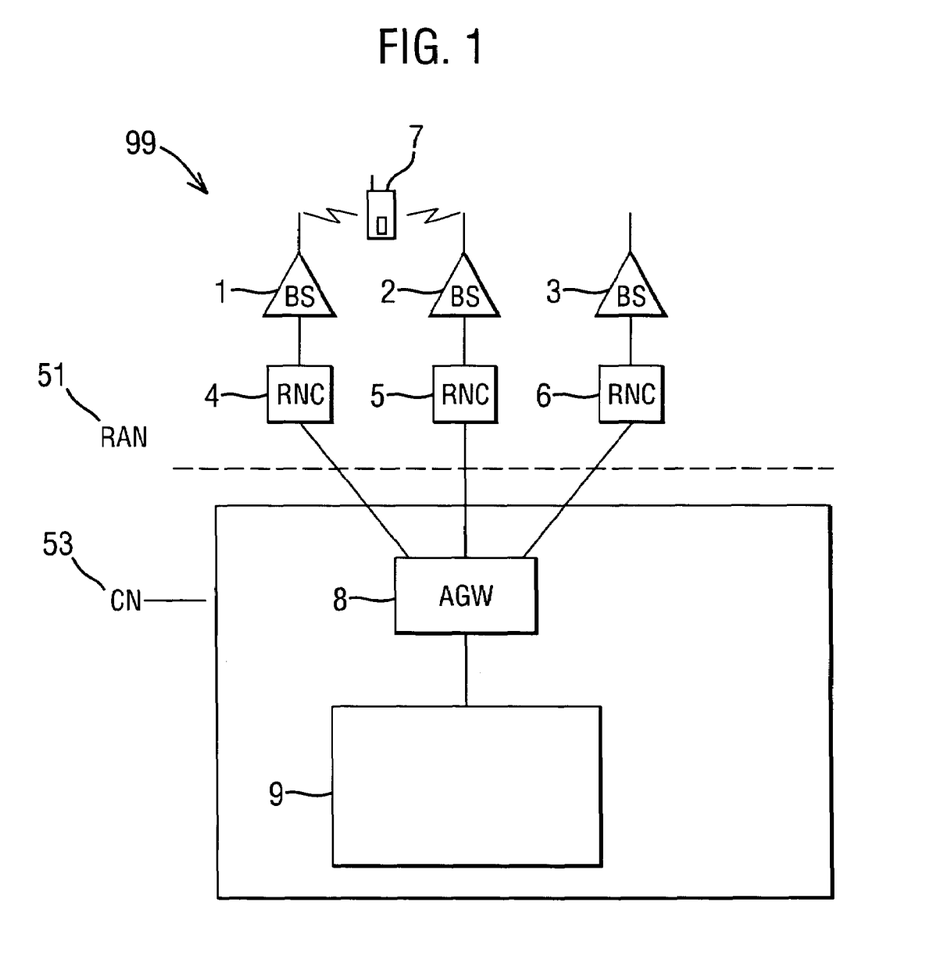
FIG. 1 shows a simplified schematic view of a mobile communication system.

FIG. 1 depicts a schematic view of a mobile communication system 99. The system can be divided, in order to simplify the understanding of the system, between the elements forming the radio access network (RAN) 51 and the elements forming the core network (CN) 53.

The RAN 51 shown in FIG. 1 comprises: a plurality of network controllers 4,5,6; and a plurality of base stations (BS) 1,2,3. FIG. 1 also shows user equipment (UE) 7 connecting to the RAN 51. Although only one user equipment is shown for simplicity, a mobile communication system comprises many user equipment terminals. User equipment can also be known as mobile devices, mobile stations, and mobile communications devices. The user equipment 7 shown in FIG. 1 is shown as a mobile communications device or mobile telephone. User equipment can also be such devices as personal digital assistants (PDA) with transceiver capability or personal computers with transceiver capability. The user equipment 7 transmits and receives using wireless communications transceivers to communicate with the base stations. In some embodiments of the present invention the user equipment are capable of transmitting and receiving communications directly and without recourse to the base stations. In other embodiments of the present invention the user equipment is capable of communicating with more than one base station.

The base stations (BS) 1, 2 and 3, transmit to and receive from the user equipment communications data. In some embodiments of the present invention the base stations 1,2,3 are capable of transmitting and receiving communications or signalling data between each other. Base stations 1,2,3 are also known as base transceiver stations (BTS). Each base station 1,2,3 is connected to a radio network controller (RNC) 4, 5 and 6.

The Radio Access Network in FIG. 1 shows, user equipment 7 wirelessly receiving and transmitting signals from and to at least one of the base stations 1, 2 and 3. Each base station and its respective RNC forms a radio access network (RAN).

A 3G radio access network (RAN) 51 connects to an appropriate core network (CN) 53. The core network 53 comprises entity or entities which handle data through the network. Examples of such are a serving general packet radio service support node (SGSN). The core network 53 further comprises entities to set-up, control or audit the flow of data, these entities have not been shown in detail in FIG. 1. An example of an appropriate control entity is the call state control function (CSCF).

In FIG. 1, the CN is shown comprising an access gateway (AGW) 8 and other core network control elements 9 responsible for switching and routing calls and data connections to other external networks.

The access gateway in some embodiments of the core network is a gateway GPRS support node (GGSN).

The call state control function entities may provide different functions such as a proxy state control function (P-CSCF), interrogating call state control function (I-CSCF), and/or serving call state control function (S-CSCF). It shall be appreciated that sometimes the CSCFs may be referred to as the call session control functions. The serving call state control function forms the entity the subscriber needs to be registered at in order to be able to request for a service from the communication system. In addition to the serving control entity, the user may need to be associated with one or more proxy and interrogating control entities.

Figure 2:
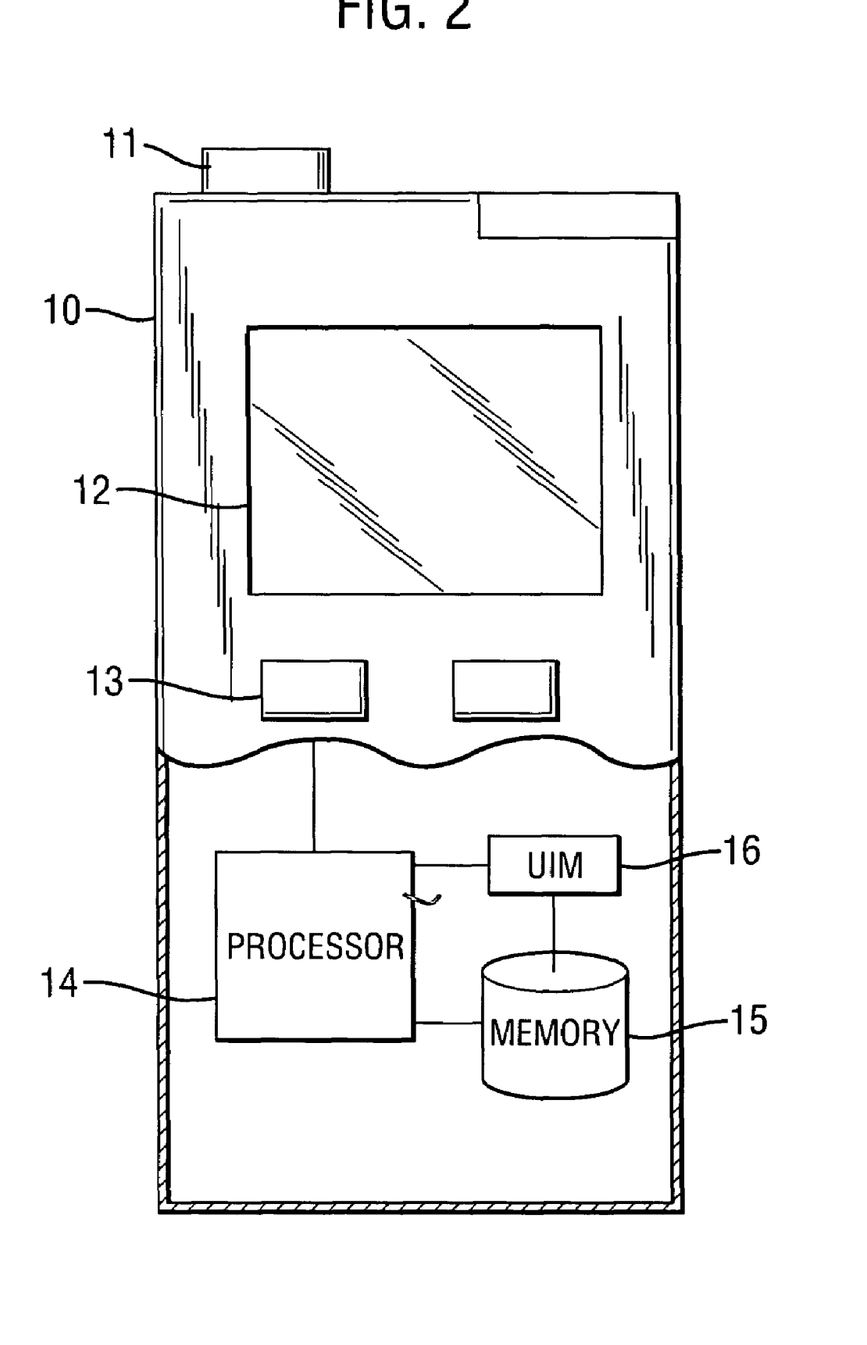
FIG. 2 shows a partially sectioned schematic view of a mobile user equipment.

With reference to FIG. 2, a schematic view of a partially sectioned image of mobile user equipment 10 as can be used in embodiments of the invention is shown. The exemplifying user equipment 10 is shown to comprise an antenna element 11, a display 12, a series of control buttons on a keypad 13, a processor entity 14, a memory 15, and a user identity module 16.

The antenna element 11 is used to wirelessly receive signals from and transmit signals to base stations of a mobile communication network.

The display 12 displays images and other visual information for the user of the mobile user equipment 10.

The operation of the mobile user equipment 10 may be controlled by means of control buttons 13 on the keypad thereof.

Furthermore, the mobile user equipment 10 is provided with a processor entity 14, a memory means 15 and a user identity module 16. The processor and memory means of the user equipment may be used in the embodiments of the present invention. More particularly, the processor may be used for the required identification and selection processes.

The user identity module 16 provides the means for the user equipment to provide the authentication of the user and also provide encryption for communication between the user equipment and the base station in order to prevent communication between the two from being intercepted in an easily understandable manner. In some user equipment the user identity module 16 is removable. The user identity module 16 in some user equipment is known as a universal integrated circuit card (UICC).

Figure 3:
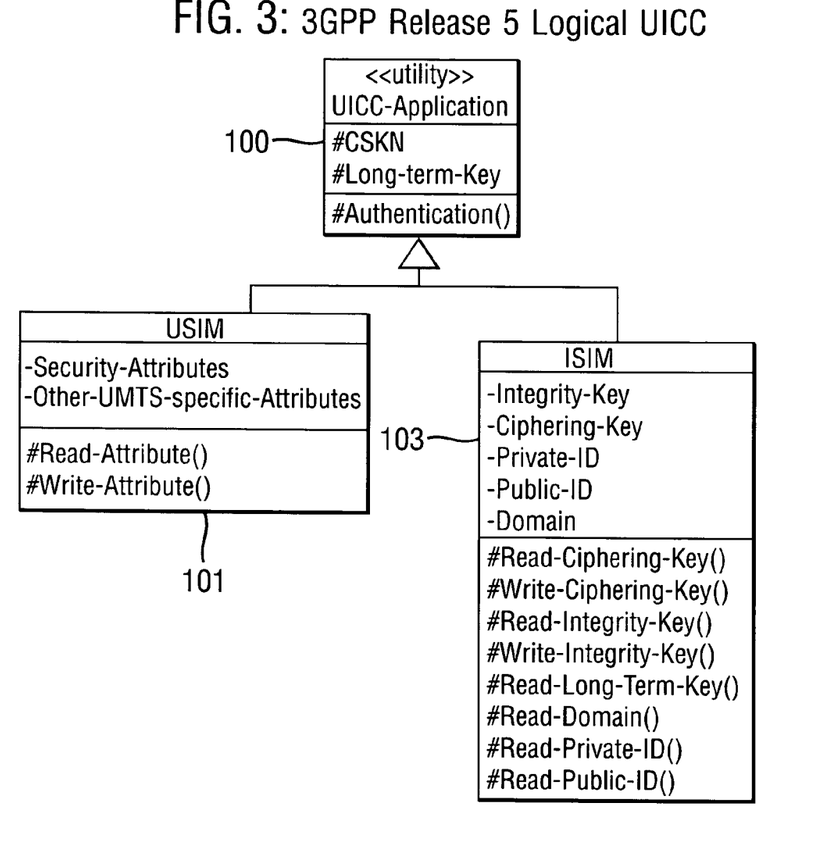
FIG. 3 shows a prior art 3GPP Release5 logical UICC.

FIG. 3 depicts a prior art 3GPP Release 5 logical UICC.

In the standards published by the standards groups ETSI and 3GPP, the universal integrated circuit card UICC 100 is defined in terms of its physical and logical characteristics (ETSI TS 102 221), and its interfacing with user equipment (3GPP TS 31.101) for providing the security and identification attributes as defined in the universal subscriber identity module (USIM) 101 in a universal mobile telecommunications system (UMTS) (3GPP TS 31.102) and also the security and identification attributes as defined in the IP multimedia services (IMS) identity module (ISIM) 103 (3GPP TS 31.103). All four documents are hereby incorporated by reference.

FIG. 3 shows the UICC 100 comprising a series of generic UICC applications and variables such as #authentication( ) and #long-term-key. The UICC further comprises USIM 101 and ISIM 103 functional entities.

The USIM functional entity 101 comprises files containing USIM applications and files containing USIM specific data as well as files containing USIM specific information data. In FIG. 3 the first division shows the title of the entity (USIM), the second division shows the USIM specific data (for example the files—security-attributes and—other-UMTS-specific-attributes are shown), the third division shows the USIM applications (for example the applications #Read-Attribute ( ) and #Write-Attribute( ) are shown).

The ISIM functional entity 103 comprises files containing ISIM applications and files containing ISIM specific data. In FIG. 2 the first division shows the title of the entity, the second division shows the ISIM specific data (for example the data within the file—Integrity-key) and the third division shows the ISIM applications (for example the application #Read-ciphering-key( ) is shown).

The UICC can contain other applications, not included in FIG. 3.

Figure 4:
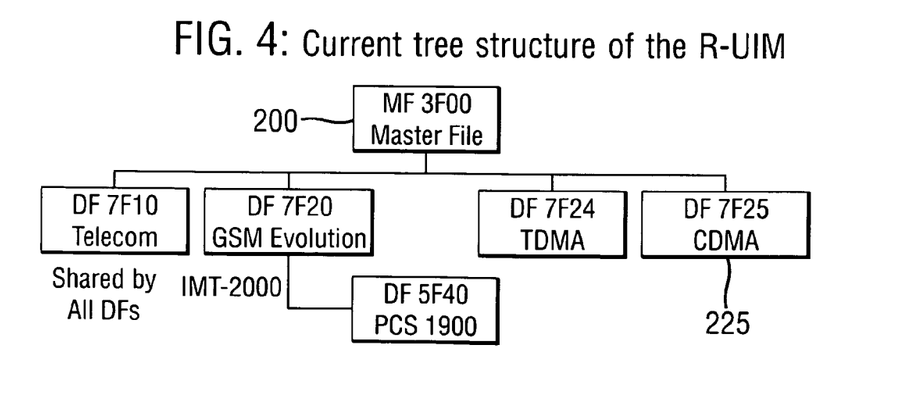
FIG. 4 shows a prior art tree structure of the data stored in the R-UIM.

FIG. 4 shows the prior art tree structure of the Removable User Identification Module (R-UIM) 200 as can be used to provide authentication and security information in the CDMA2000 telecommunications system. As described previously the R-UIM system adopted the physical and electrical specifications of GSM SIM. The GSM SIM specification is defined in the document GSM 11.11 and is hereby incorporated by reference. While the logical structure for data storage in the R-UIM 200 is similar to GSM Subscriber Identity Module (SIM), comprising the files: master file (MF3f00), and the directory files (DF), telecom file (DF 7f10), the GSM Evolution file (DF 7f20), the TDMA file (DF 7f24), the PCS 1900 file (DF 5f40) and the CDMA file (DF 7f25).

The file structure of the R-UIM is also similar to that provided by the GSM SIM. The master file has a directory containing the directory files, telecom, GSM Evolution, TDMA, and CDMA files, and the GSM Evolution file having a directory containing the directory file PCS 1900. Further each of the directory files can further comprise directory files or elementary files (EF), these further directory and elementary files are not shown in FIG. 4. The elementary files, as described in document 3GPP2 C.S0023-A, available on the web at address http://www.3gpp2.org/Public html/specs/ C.S0023-A v1.0.pdf, and hereby incorporated by reference, contain data used in the operation of the applications described by the directory files.

The major difference between the GSM SIM and the R-UIM is the requirement to handle CDMA2000 data, for example identification and subscription information. The standards required in CDMA2000 therefore define the directory file (DF) CDMA. Thus the CDMA2000 operation owns and controls its "directory file" (DF). The CDMA2000 directory file "DF 7F25" 225 stores information for the CDMA family of standards (for example the CDMA standards IS-95, IS-2000). As discussed previously the structure of the R-UIM is capable of only supporting one application at a time, for example if the R-UIM supports a CDMA2000 application using the master file, and the CDMA2000 directory file it is unable to support a further application. In the CDMA2000 directory files or dependent elementary files no attributes or methods are defined for IMS and therefore it is not possible to run IMS and CDMA2000 applications concurrently.

Figure 5:
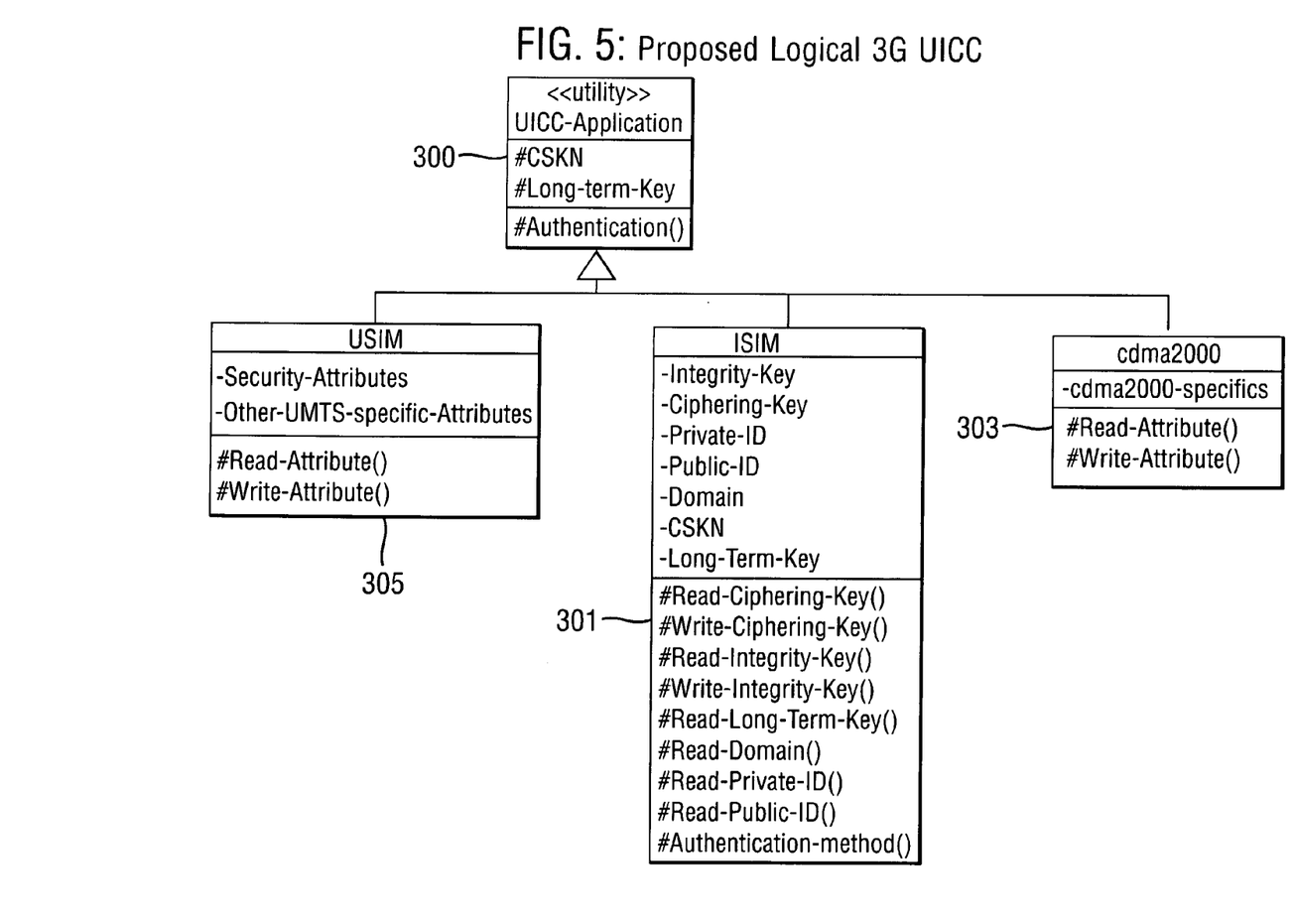
FIG. 5 shows a schematic view of the data structure within an enhanced UICC according to a preferred embodiment.

With reference to FIG. 5 an embodiment of the present invention showing the data structure of a user identity card that may be used for parallel access and also via at least two access systems to a service via a core network of the communication system is shown. In the embodiment described below, a conventional user identity module is modified so that the IMS application (ISIM) is totally decoupled from the IP connectivity application, UMTS (USIM).

FIG. 5 shows the data structure of a removable user identification module for use in CDMA2000 networks as well as for use in UMTS networks. The R-UIM in this embodiment of the present invention comprises an UICC 300. The data structure of the UICC according to embodiments of the present invention differs from that in prior art UICCs for use in UMTS networks only. The UICC in embodiments of the present invention can comprise either zero, one, or more IMS core network application. In the embodiment of the present invention shown in FIG. 5 the UICC comprises a single ISIM application 301.

The UICC further comprises in embodiments of the present invention a number of IP connectivity applications. This number may in embodiments of the present invention range from Zero to n IP connectivity applications, where n is a natural integer value. In the embodiment shown in FIG. 5 the UICC comprises two IP connectivity applications, a CDMA2000 application 303 (for connection to a CDMA2000 network) and a USIM application 305. In some embodiments of the invention the USIM application can be used for connection to a UMTS access point, or a WLAN (Wireless Local Area Network). The UICC in some embodiments of the present invention further comprise a number of other non-mobile communications applications. These non-mobile communication applications are not shown in FIG. 5, but are known in the art to include such applications as mobile banking, mobile commerce, or a fragment of computer code such as a JAVA applet run on the machine reading the card.

In some embodiments of the present invention the security attributes and mechanisms used in the telecommunications connectivity are defined in the application itself. In such embodiments of the present invention the security attributes and mechanisms from the applications can override the one defined for the IP connectivity. This differs from the prior art as experienced in some access networks where the use of a removable device in user equipment is only optional. In such user equipment the identity of the user and the security attributes and mechanisms are embedded in the user equipment and thus can not be considered to be separable.

This embodiment allows the complete separation between IP connectivity and security information. For example, if in the embodiment shown in FIG. 5 the ISIM application 301 uses the security mechanism to exchange the generation of the authentication keys, and the exchange of these keys between the terminal and the network known as Authentication and Key Agreement (AKA) for mutual authentication, the IP connectivity application (ISIM) can use, for example, a separate security mechanism known as Cellular Authentication and Voice Encryption (CAVE).

Prior art CDMA2000 user equipment (UE), for example mobile phones, contain CDMA2000 information and specific security and authentication algorithms (methods) with which the user equipment connected to the CDMA2000 network. The user equipment incorporating embodiments of the present invention and may alternatively choose to operate in the CDMA2000 network environment in one of the following ways:

1. To use the information defined on the UICC (card) as featured in embodiments of the invention only for allowing the mobile to connect to the IMS. In other words to use the information stored in the ISIM application; or 2. To add IMS information and specific methods from the information defined on the UICC to the information already stored in the UEs; or 3. To derive ISIM attributes (such as the domain and the Ids of the users) from current information stored either on the user equipment or on the UICC (card).

In order to be capable of implementing embodiments of the present invention on the UICC new Elementary Files are created to support the ISIM feature. In this embodiment two Elementary files: EF Long-term Key (K) and EF CSKN are created. EF Long-term Key, and EF CSKN contain data enabling the user equipment to access the IP system over the CDMA2000 network.

In some embodiments of the present invention the UICC may comprise within the ISIM application, an authentication method (algorithm). This authentication method is designated in some embodiments of the present invention to be, IMS Authentication and Key Agreement (AKA), and is provided in embodiments of the invention when the IP connectivity is not provided by an UMTS network. In such embodiments of the present invention, only the applications accessing the UMTS network are enabled to use the same authentication algorithm, with applications using the alternative network enabled to use the same or alternative authentication methods.

In a further embodiment of the invention the UICC supporting CDMA2000 access further includes an ADF (Application Dedicated File) CDMA2000 in the EF directory of the UICC.

Figure 6:
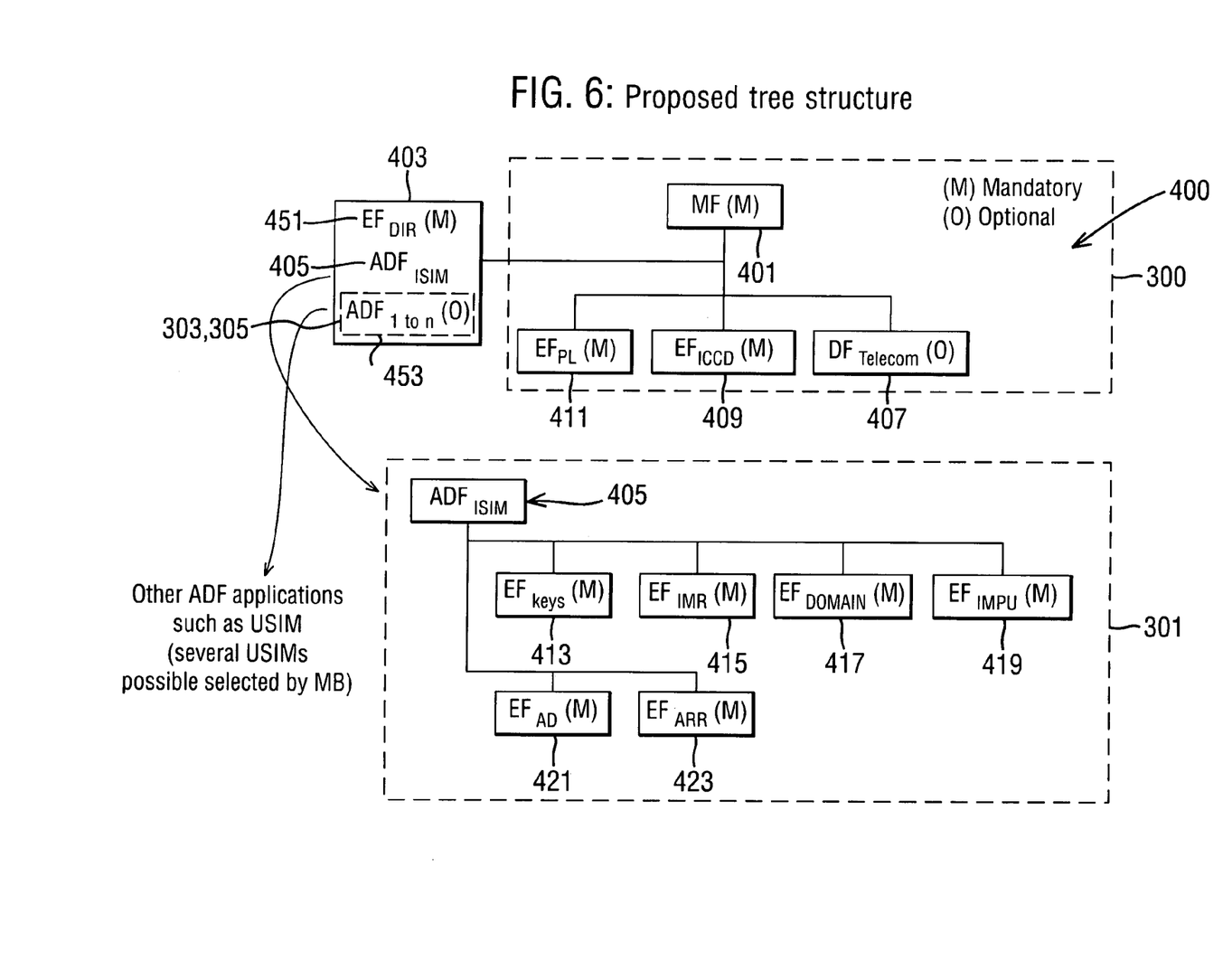
FIG. 6 shows a schematic view of a data tree structure within the enhanced UICC according to a preferred embodiment.

With respect to FIG. 6, the data tree structure of a preferred embodiment of the UICC 400 incorporating cdma2000 access is shown. Where there is a relationship between the data tree structure of FIG. 6 and the logical structure as shown in FIG. 5, the relationship has been marked by a dashed box and labelled. The data tree shows the master file 401. The master file, as defined in ETSI TS 102 221, is implicitly selected and becomes the current directory when the user equipment containing the UICC is switched on or reset. The user equipment can then select any other file contained on the UICC by using a select command in order to read the relevant information to implement the application to be run. In a preferred embodiment of the present invention there are three elementary files at the same level as the master file. The three elementary files are EF Preferred Languages $EF_{PL}$ 411, EF Integrated Circuit Card Identification $EF_{ICCD}$ 409, and EF Directory $EF_{DIR}$.451. The combination of these elementary files and the master file are the equivalent to the UICC-application 300. The EF Preferred Languages contains language codes, which are defined in order of preference. The EF Integrated Circuit Card Identification provides an unique identification value for each of the UICCs. The EF Directory consists of one or more records with each record holding a single entry. Each entry in the EF Directory is a data object. The data object identifies the application identifiers (AIDs) and the application labels on the UICC (the AIDs of 3GPP applications are defined in ETSI TS 101 220, the document is hereby incorporated by reference).

In a first embodiment of the present invention the UICC comprises at least two application dedicated files (ADFs). A first type of the at least two application dedicated files are those applications relating to access to a communications network. The first type, shown in FIG. 6 as $ADF_{1-to-n}$, contain directory and elementary files containing data and applications in order that the user equipment can access at least one communication network. In one embodiment of the present invention one of these ADF applications is the CDMA2000 ADF. Each of the communication ADFs and their associated directory and elementary files are the equivalent of the applications shown in FIG. 5 relating to the network applications 303, 305.

In other embodiments other UMTS networks are supported by the UICC comprising additional ADFs. In some embodiments of the invention the network accessed is selected from the user equipment.

The second type of application dedicated files are the IM Services Identity Module (ISIM) 405 ADFs. In the embodiment shown in FIG. 6 one $ADF_{ISIM}$ is shown. In alternative embodiments more than one IM services identity module is available. The $ADF_{ISIM}$ 405 is shown in further detail to comprise a series of elementary files, the EF Ciphering and Integrity Keys for IMS ($ADF_{Keys}$) 413, the EF IMS private user identity ($EF_{IMPI}$) 415, the EF Home Network Domain Name ($EF_{Domain}$) 417, the EF IMS public user identity ($EF_{IMPU}$) 419, the EF Administrative Data ($EF_{AD}$) 421, and the EF Access Rule Reference ($EF_{ARR}$) 423. The IM services identity module ADFs are equivalent and their associated directory and elementary files are the equivalent to the ISIM applications 301.

The $EF_{Keys}$ 413 file is the file which contains the ciphering key CK, the integrity key IK and the key set identifier KSI for the IP multimedia subsystem. The $EF_{IMPI}$ 415 is the file containing the private user identity of the user. The $EF_{Domain}$ 417 is the file containing the home operator's network domain name, in other words the simple internet protocol uniform resource locator (SIP URI). The $EF_{IMPU}$ 419 is the file containing one or more public SIP Identities of the user, in other words the SIP URIs by which other parties know the subscriber. The $EF_{AD}$ 421 is the file containing information concerning the mode of operation according to the type of ISIM, such as normal (used by IMS subscribers for IMS operations), type approval (allowing specified use of the user equipment during type approval procedures), or manufacturer specific (to allow the user equipment to perform specific automatic testing). The $EF_{AD}$ is the file containing information providing an indication of whether some user equipment features are to be activated during normal operation. The $EF_{ARR}$ 423 is the file containing the access rules for files located under the ISIM ADF in the UICC.

Although not shown in the FIG. 6, the equivalent functionality to that provided by the DF CDMA in FIG. 4 is found in embodiments of the present invention as an Elementary File (EF) under the ADF CDMA.

In further embodiments of the present invention the functionality carried out by EFs in the prior art are carried out in embodiments of the present invention as EFs located under the ADF referenced to CDMA2000.

With reference to FIG. 6 the CDMA2000 ISIM as featured in the data structure of the embodiment shown is close to the 3GPP ISIM which is defined in the standard reference document 3GPP TS 31.103.

In embodiments of the present invention it is therefore possible to store the following information in the UICC:

1. One IM Private Identity (IMPI) as a Network Access Identifier (NAI) formatted according to RFC 2486 (Request for Comments) by the Internet Engineering Task Force (IETF). This document is herein incorporated by reference. It is assigned by the home network operator, and is used for Authentication, Authorisation, Administration and Accounting purposes;

2. One or several IM Public Identity (IMPU) formatted as a Simple Internet Protocol (SIP) Uniform Resource Locator (URL) according to RFC2543 or RFC2396 or E.164 number, as is known in the art. The IMPU is used to initiate communications with other users. The user can have more than one but only one is stored to ISIM;

3. Home Network Domain Name to identify the Interrogating Call State Function (I-CSCF);

4. Sequence number checking in the context of the IMS domain; or

5. Key (K), a long term private key stored in both the ISIM and the CDMA2000 access network (home network), used for mutual authentication between the MS and IMS and for deriving at least one session key, e.g., ciphering or integrity keys used during the SIP session.

In some embodiments of the present invention the Sequence number and the Key information is not stored in the UICC.

Figure 7:
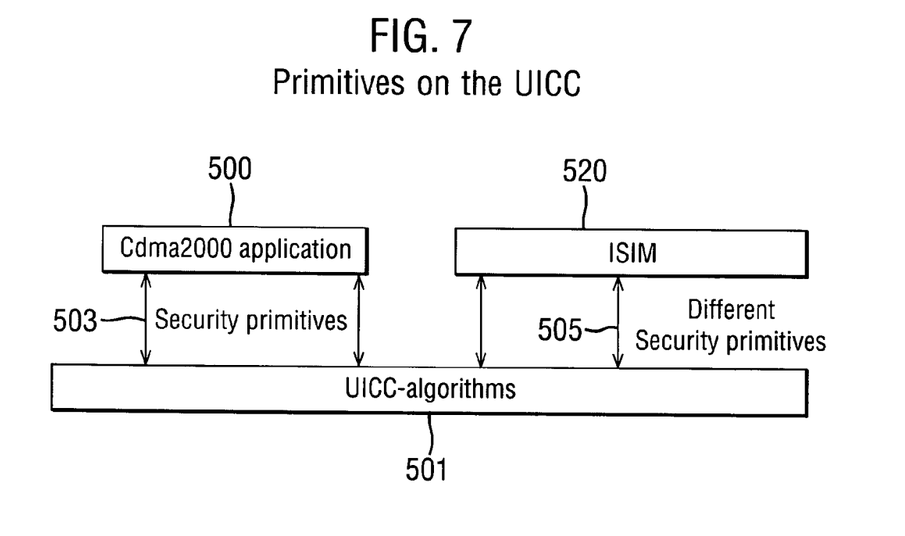
FIG. 7 shows a schematic view of the relationships between primitives on the within the enhanced UICC according to a preferred embodiment.

With reference to FIG. 7, the flow of data during exchange and modification of primitives between the applications are shown. Primitives are fragments of computer code capable of being interpreted by a microprocessor such as that within the user equipment. These fragments of computer code are the building blocks used to provide application functionality. A type of primitives, the Security primitives, can for instance control encryption, key exchange, hash functions, and digital signatures.

Primitives used by applications can be designated as being "Common", in other words are accessible by all applications. An example of a "Common" primitive is the SELECT primitive, which is used to access record fields owned by applications. The opposite to the "Common" primitive is the "Private" primitive, where only one or a select number of applications have access to these primitives. FIG. 7 shows a schematic of a view of the embodiment of the present invention where the whole group of primitives or algorithms are grouped together 501 and stored in the UICC. The CDMA application 500 as also shown in FIG. 5 as the application box 303, has access to the security primitives which it is allowed access 503. The ISIM application 520 as also shown in FIG. 5 as the application box 301, has access to the security primitives which it is allowed access 505. Thus for example, security primitives for authentication/authorisation are different for the ISIM application 520 and the CDMA2000 application 510.

In some embodiments of the present invention primitives supported by the prior art R-UIM are available only to the cdma2000.

Embodiments of the present invention as described above are therefore capable of being configured in order that the security mechanisms are flexible and therefore effectively open. Thus for instance if a new application uses a stored security mechanism or primitive, the application can be allowed to access the primitive and thus use the security method. For example if the IMS security solution for the 3GPP2 key exchange application supports AKA then the copying of the AKA solution provided by the 3GPP AKA key exchange can be carried out.

Furthermore if IMS has to use the access network mechanism for confidentiality protection allows the user equipment to operate with both the network access confidentiality protection, which in the case of CDMA2000 radio interface confidentiality mechanism CAVE, and the IMS system AKA. This is not possible to implement in the prior art.

Figure 8:
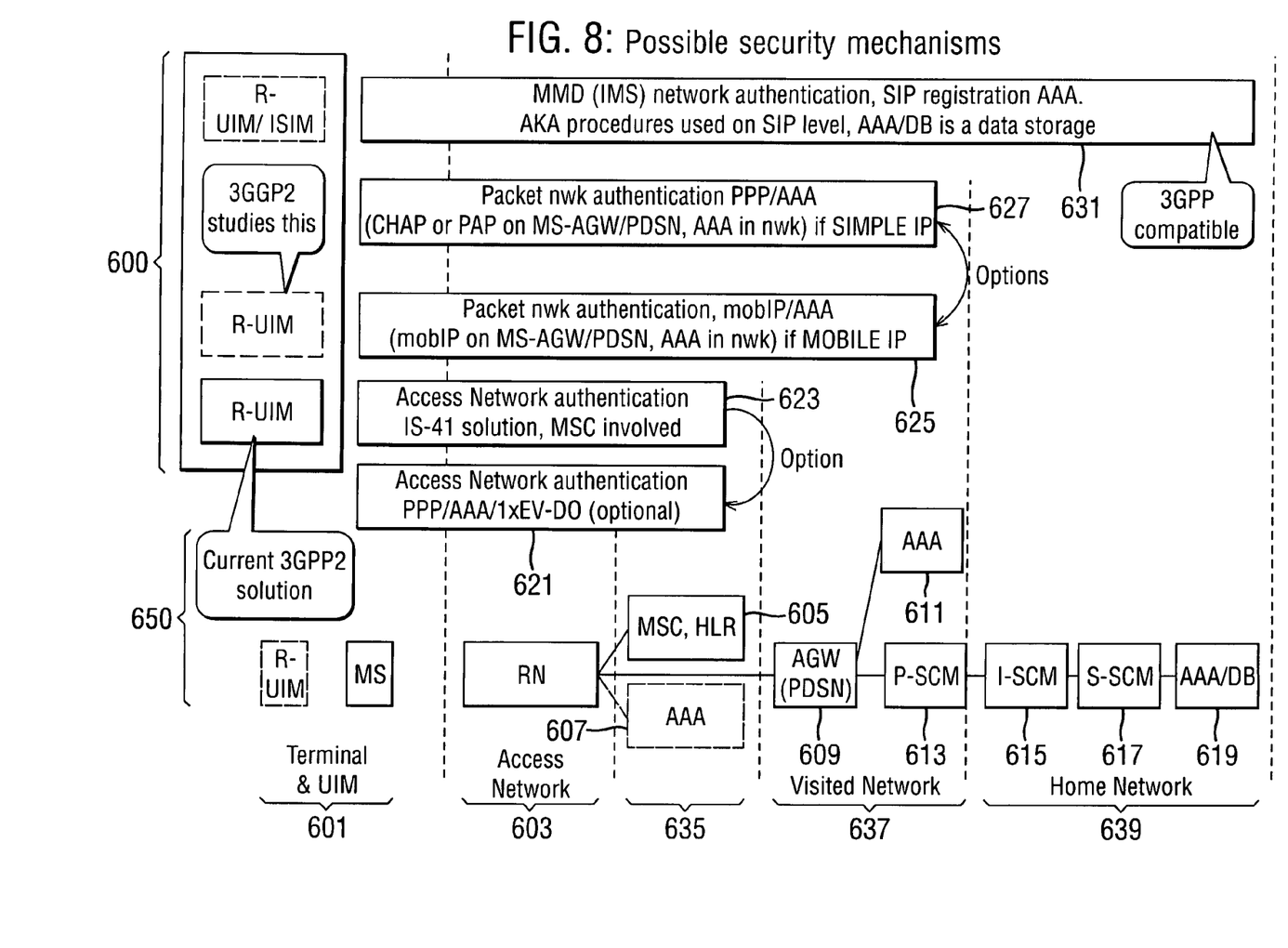
FIG. 8 shows a view of the security mechanisms capable of being employed using the enhanced UICC in one or more preferred embodiments.

With reference to FIG. 8 a series of possible security mechanisms which can be implemented by embodiments of the present invention are shown.

The lower half of the FIG. 650 show network elements which go to create the communications network. The user equipment (or terminal) and the UIM 601, the access network 603 & 635, the visited network 637, and the home network 639. As is known in the art the R-UIM and the user equipment are connected via a wireless communications link to the radio network within the access network 603. The access network 603 typically consists of the base transceiver station which communicates with the user equipment over the wireless communications link. The access network 603 is typically connected to such network elements as an authentication, authorisation, and accounting node (AAA) 607, which provides the network with a record of who is accessing it and what is being accessed, and/or a mobile switching centre (MSC) 605 (which in some networks is also known as a home location register (HLR) server).

If the user equipment is making a communications link via a visited network 637 (such as the case where the user equipment is making a call from a foreign country), the communications link is passed though an access gateway (AGW) 609, and a proxy session control manager (P-SCM) 613. The P-SCM connects to the home network 639 and the Interrogating session control manager (I-SCM) 615 and the serving session control manager (S-SCM) 617.

The visited network 637 can further consist of a further authentication, authorisation, and accounting node (AAA) 611 connected to the access gateway (AGW) 609. In the home network 639 The S-SCM 617 can connect to a further authentication, authorisation, and accounting node (AAA) 619.

The upper half 600 of FIG. 8 shows the various possible security mechanisms which can be implemented by embodiments of the present invention with respect to the coverage of the security mechanism.

A first pair of security mechanisms are used between the user equipment and the access network. The first access network authentication 623 uses the IS-41 solution as is known in the art, and involves the mobile switching centre. In other embodiments of the present invention an alternative access network authentication 621 can be used. The alternative authentication uses a Point-to-Point protocol and involves the authentication, authorisation, and accounting node (AAA) 607. The alternative access network authentication is particularly efficient in embodiments operating within enhanced CDMA2000 systems such as the 1× evolved data-only networks (1×EV-DO)

The second pair of security mechanisms shown in FIG. 8 perform packet network authentication, in other words authentication from the user equipment to a core network (which is shown in FIG. 8 as the visited network 627). The first alternative 627 is the packet network authentication using Point-to-Point protocol (PPP) and involves the use of the visited networks authentication, authorisation, and accounting node (AAA) 611. The authentication protocol used in this embodiment of the invention also uses the access gateway/packet data serving node (PDSN) 609. The authentication protocol used in embodiments of the invention carrying out such an authentication can be the challenge-handshake-authentication protocol (CHAP) or password authentication protocol (PAP). The first packet network authentication method is used where the URI is a simple Internet Protocol (IP) address.

In embodiments of the present invention a second packet network authentication method is used there the URI is a mobile internet protocol address (MobIP). In the second packet network authentication method 625, the authentication is carried out over a Mobile internet protocol (MobIP) link, and is typically between the user equipment and the authentication, authorisation, and accounting node (AAA) 611. In such an embodiment the actual authentication is controlled by the MobIP. In other embodiments of the present invention the authentication involves the use of the access gateway (AGW)/packet data serving node (PDSN) 609.

In a further example of the flexibility of the present invention the preferred embodiment can also carry out multimedia domain (MMD) network authentication. MMD authentication uses a session initiation protocol registration to the home network's authentication, authorisation, and accounting node 619. In detail, MMD authentication uses the AKA method used in session initiation protocol registration, and relies on the home network authentication, authorisation, and accounting node or database as a data storage.

The demand for a solution which supports both multiple applications in the cdma2000 access network and an IMS core network application, i.e. a SIM structure which is network agnostic is met by embodiments of the present invention. The use of a modified UICC carrying out the smart-card functionality enables a network agnostic subscriber identity module to be implemented and used in user equipment to be able to handle multiple simultaneous and independent applications to be carried out by the same user equipment.

Furthermore embodiments of the present invention when implemented along with IMS core network applications on the UICC for 3GPP networks enables access, in the sense of providing authentication information, to different access networks such as the following:

a) Universal Mobile Telecommunications System (UMTS) where the application is called USIM. For more information, please refer to 3GPP TS 23.111: USIM and IC card requirements (hereby incorporated by reference); and b) Code Division Multiple Access 2000 (cdma2000), where the user equipment is able to read a UICC card. This application contains the necessary information (including security) and specific algorithms for authentication to cdma2000 networks, and security protection.

The following advantages are therefore provided by the preferred embodiment of the present invention:

a) One of the applications, IM (IP-Based Multimedia) Services Identity Module (ISIM), can have its own identity structure independently of the cdma2000 authentication mechanism. For example, cdma2000 may use CAVE as access, and IMS Authentication & Key Agreement (AKA) for the IMS.

b) There is support of IMS in cdma2000 for:
  (i) Security: network access application may provide authentication as well as integrity protection for IMS users in the same way as 3GPP users; and
  (ii) Storage of IMS information.

c) There is flexibility as multiple applications can be run in parallel and can share information, and/or algorithms.

d) IMS Roaming is facilitated between 3GPP & 3GPP2.

e) Evolution of applications on the UICC is facilitated.

Although described in the context of particular embodiments, it will be apparent to those skilled in the art that a number of modifications and various changes to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above and claimed hereafter.

The invention claimed is:

1. An apparatus comprising:
a user identification module for user equipment for use in an access network,
wherein said module is configured to enable a plurality of access network applications to run, wherein the module is configured to enable a core network application to run, and wherein the module is configured to enable said core network application to run in parallel with at least one of the plurality of access network applications; and
wherein the user identification module is configured to generate authentication data for a core network and the access network, wherein the authentication data for said core network and the access network is dependent on a common data set, wherein the common data set comprises at least one shared key between the access network and the access network application or the core network application, and wherein the shared key is configured to generate one or more required keys.

2. An apparatus as claimed in claim 1, wherein said plurality of access network applications run in parallel.

3. An apparatus as claimed in claim 1, wherein said common data set comprises data for use in encryption.

4. An apparatus as claimed in claim 1, wherein said access network comprises at least one of:
a code division multiple access network;
a universal mobile telecommunications system network;
a wireless local area network;
a global system for mobile communications network;
a digital advanced mobile phone system network;
an advanced mobile phone system network,
a wideband code division multiple access network.

5. An apparatus as claimed in claim 1, wherein said core network application is an internet protocol multimedia service.

6. An apparatus as claimed in claim 1, said apparatus comprising a universal integrated circuit card.

7. A system comprising
a plurality of access networks;
at least one user equipment configured to be used in at least one of said access networks; and
a user identification module configured to be used in the at least one user equipment,
wherein said module is configured to enable a plurality of access network applications and at least one core network application to run, wherein said core network application runs in parallel with at least one of the plurality of access network applications, and
wherein the user identification module is further configured to generate authentication data for the core network and the access network, wherein the authentication data for said core network and the access network is dependent on a common data set that comprises at least one shared key between the access network and the access network application or the core network application, and wherein the shared key is configured to generate at least one required session key.

8. A system as claimed in claim 7, wherein said plurality of access network applications run in parallel.

9. A system as claimed in claim 7, wherein said common data set comprises data for use in encryption.

10. A system as claimed in claims 7, wherein said access network comprises at least one of:
a code division multiple access network;
a universal mobile telecommunications system network;
a wireless local area network;
a global system for mobile communications network;
a digital advanced mobile phone system network;
an advanced mobile phone system network,
a wideband code division multiple access network.

11. A system as claimed in claim 7, wherein said core network application is an internet protocol multimedia service.

12. A system as claimed in claim 7, said module comprising a universal integrated circuit card.

13. A method, comprising:
enabling a plurality of access network applications to run;
enabling at least one core network application to run, wherein said core network application runs in parallel with at least one of the plurality of access network applications; and
generating authentication data for a core network and an access network, the authentication data for said core network,
wherein the authentication data for said core network and the access network is configured to be dependent on a common data set, the common data set is configured to comprise at least one shared key between the access network and the access network application or the core network application, and the shared key is configured to generate a required session key or keys.

14. A method as claimed in claim 13, wherein said enabling of the plurality of access network applications to run comprises:
  enabling a first access network application to run,
  enabling a second access network application to run,
  wherein said first and second access network applications are enabled to run in parallel.

15. A computer readable medium having computer-executable components for implementing a method, the method comprising:
  enabling a plurality of access network applications to run;
  enabling at least one core network application to run, wherein said core network application runs in parallel with at least one of the plurality of access network applications; and
  generating authentication data for a core network and an access network, the authentication data for said core network, wherein the authentication data for said core network and the access network is configured to be dependent on a common data set, the common data set is configured to comprise at least one shared key between the access network and the access network application or the core network application, and the shared key is configured to generate a required session key or keys.

16. The computer readable medium of claim 15, wherein the enabling of a plurality of access network applications to run comprises:
  enabling a first access network application to run,
  enabling a second access network application to run,
  wherein said first and second access network applications are enabled to run in parallel.

* * * * *